(12) United States Patent
Rodrich

(10) Patent No.: US 9,213,098 B2
(45) Date of Patent: Dec. 15, 2015

(54) METHOD AND DEVICE FOR DETECTING PRESENCE OF VEHICLE IN PARKING SPACE

(71) Applicant: Moises Jaime Rodrich, Lima (PE)

(72) Inventor: Moises Jaime Rodrich, Lima (PE)

(*) Notice: Subject to any disclaimer, the term of this patent is extended or adjusted under 35 U.S.C. 154(b) by 75 days.

(21) Appl. No.: 14/025,129

(22) Filed: Sep. 12, 2013

(65) Prior Publication Data

US 2014/0112101 A1 Apr. 24, 2014

Related U.S. Application Data

(60) Provisional application No. 61/699,951, filed on Sep. 12, 2012.

(51) Int. Cl.
*G08G 1/14* (2006.01)
*G01S 15/04* (2006.01)

(52) U.S. Cl.
CPC ............. *G01S 15/04* (2013.01); *G08G 1/142* (2013.01)

(58) Field of Classification Search
CPC ......... G08G 1/144; G08G 1/00; G08G 1/017; G08G 1/0175; G08G 1/052; G08G 1/056; G08G 1/133; G08G 1/14; G08G 1/142; G08G 1/143; G08G 1/146; G08G 1/147; G08G 1/148; G06K 9/00; G06K 9/00771
USPC ...................... 340/932.2, 936, 937, 938, 939, 340/931–932, 929, 925, 911, 909, 917, 904
See application file for complete search history.

(56) References Cited

U.S. PATENT DOCUMENTS

| | | | |
|---|---|---|---|
| 2002/0109610 A1* | 8/2002 | Katz ........................... | 340/932.2 |
| 2002/0109611 A1* | 8/2002 | Howard ...................... | 340/932.2 |
| 2006/0152349 A1* | 7/2006 | Ratnakar ..................... | 340/426.1 |
| 2011/0099126 A1* | 4/2011 | Belani et al. ................. | 705/418 |
| 2011/0102197 A1* | 5/2011 | Herwich ...................... | 340/932.2 |
| 2014/0085112 A1* | 3/2014 | Gruteser et al. ........... | 340/932.2 |

FOREIGN PATENT DOCUMENTS

| | | | |
|---|---|---|---|
| EP | 1 530 183 | * 11/2004 | |
| EP | 1530183 | 5/2005 | |

* cited by examiner

*Primary Examiner* — Daniel Previl

(57) ABSTRACT

A method for notifying a user of the status of a parking space. The method comprises transmitting a pulse from a transceiver assigned to a parking space and for each pulse receiving by transceiver a corresponding echo created by said pulse being reflecting back from a object occupying said parking space. The method further comprises measuring corresponding echo time by a processing unit. The method further comprises comparing said corresponding echo time to a predefined range of echo times by a processing unit to determine occupancy of said parking space. The method further comprises using said occupancy of parking space to determine the parking space status by a processing unit, together with information on time of day and parking space permission. The method further comprises notifying a user of said parking space status by visual indication from at least one light emitting diode array.

24 Claims, 26 Drawing Sheets

Green icon indication for available parking space

Red icon indication for occupied parking space

Blue icon indication for available handicapped parking space

Parking icon indication for available parking space on map

2301

METHOD AND DEVICE FOR DETECTING PRESENCE OF VEHICLE IN PARKING SPACE

RELATED APPLICATIONS

This application claims the benefit of priority under 35 USC 119(e) of U.S. Provisional Patent Application No. 61/699,951 filed on Sep. 12, 2012, the contents of which are incorporated herein by reference.

FIELD AND BACKGROUND OF THE INVENTION

The present invention, in some embodiments thereof, relates to motor vehicle parking and, more particularly, but not exclusively, to parking space monitoring and/or notification.

Various parking space monitoring devices have been developed to solve the problem of locating an empty parking space in a parking lot structure. Park Assist has developed a solution using a high resolution camera to recognize if parking spaces are empty or occupied, and indicates availability with a green or red light emitting diode (LED) respectively. Data communication and power transfer is performed for the Park Assist solution through wires. TCS International has developed a solution where an ultrasonic transceiver is attached to the ceiling above the parking space, and uses similar LED indications to notify drivers of availability. Data and power are also transferred through wires. Streetline uses a magnetometer to detect the availability of empty parking spaces for street parking that are connected wireless mesh networks. There are no visual indicators on this device and all availability data is accessed through an internet server.

European patent application EP1530183A2 teaches of a Parking Indicator and Control system that uses ultrasonic sensors for determining if a parking space is empty or occupied, an LED indication system and wired communication to a controller that notifies drivers of available parking spaces at a central location. In this application power and data are transferred through wires.

SUMMARY OF THE INVENTION

According to some embodiments of the present invention there is provided a method for notifying at least one user of the status of at least one parking space, comprising. The method comprises transmitting at least one pulse from at least one transceiver assigned to a parking space and for each pulse receiving by transceiver a corresponding echo created by said pulse being reflecting back from at least one object occupying said parking space. The method further comprises measuring corresponding echo time by at least one processing unit. The method further comprises comparing said corresponding echo time to a predefined range of echo times by at least one processing unit to determine occupancy of said parking space. The method further comprises using said occupancy of parking space to determine the status of said parking space by at least one processing unit, together with information on time of day and parking space permission. The method further comprises notifying at least one user of said parking space status by visual indication from at least one light emitting diode array.

Optionally, the user is a driver of a motor vehicle looking for a parking space, and the driver uses the visual notification to find a parking space for the vehicle.

Optionally, the notification of parking space status is further transferred to at least one internet server together with information on geographic location of the parking space.

Optionally, the user is a driver of a motor vehicle looking for a parking space, the driver parks their motor vehicle in the parking space, and the internet server notifies said driver when the vehicle has been moved.

Optionally, the user is a parking manager and the internet server transfers to the parking manager a plurality of parking space status notifications, both current and historical, which are used to plan future parking resources.

Optionally, the user is parking enforcement officer, and the internet server transfers the parking space notification which is of a status that corresponds to a parking violation.

Optionally, the at least one transceiver is an ultrasound transceiver and the at least one pulse is an ultrasound pulse.

Optionally, the transceiver is a multiple sensor transceiver assigned to a plurality of parking spaces and the processing unit produces a plurality of associated parking space statuses.

Optionally, the echo time is further processed by the at least one processing unit to convert echo time to distance to the parked vehicle and the predefined range is measured by distance units allowing more convenient installation.

According to some embodiments of the present invention there is provided a device for monitoring and notifying at least one user of the status of at least one parking space. The device comprises at least one transceiver which transmits at least one pulse and receives at least one echo from the pulse that has reflected off an object occupying the at least one parking space. The device further comprises at least one processing unit configured for measuring time between said pulse and said corresponding echo for determining status of said associated at least one parking space. The device further comprises at least one light emitting diode array capable of at least one visual notification through the use of emitted light colors, light flashing rates, and light flashing patterns for notifying the at least one user of status of the at least one parking space. The device further comprises at least one power source for supplying power to the at least one transceiver, the at least one processing unit, and the at least one light emitting diode array. The device further comprises a housing for containing the at least one transceiver, the at least one processing unit, the at least one power source and the at least one light emitting diode array wherein the housing is specifically designed to provide protection of internal components against adverse effects of the environment and against adverse effects of vertical and sheer stresses from motor vehicles rolling over housing.

Optionally, the device further comprises an RF electronics transceiver to send the at least one parking space status to and receive instructions from at least one internet server, relayed through at least one routing controller.

Optionally, the at least one power source is at least one alkaline battery contained within the housing to provide power to the at least one transceiver, the at least one processing unit, and the at least one notification unit.

Optionally, the at least one power source is at least one rechargeable battery contained within the housing to provide power to the at least one transceiver, the at least one processing unit, and the at least one notification unit.

Optionally, the device further comprises at least one photovoltaic cell for recharging the at least rechargeable battery contained within the housing to provide power to the at least one transceiver, the at least one processing unit, and the at least one notification unit.

Optionally, the at least one power source is at least one alternating current power supply external to the housing to provide power to the at least one transceiver, the at least one processing unit, and the at least one notification unit.

Optionally, the at least one transceiver is at least one ultrasound transceiver.

Optionally, the at least one transceiver comprises a separate at least one emitter and separate at least one receiver.

Optionally, the at least one transceiver is a plurality of transceivers for monitoring a plurality of corresponding the parking spaces.

Optionally, the housing contains structural elements designed to withstand rollover pressures from vehicles.

Optionally, the housing includes an integrated o-ring seal between top and bottom halves of the housing to offer protection from adverse effects due to the environment, including dust, humidity, water and the like.

Optionally, the device is located adjacent to the parking space.

Optionally, the device is located up to 4 meters from the parking space.

Optionally, the housing contains at least one recess in the housing for protection of at least one corresponding transceiver.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
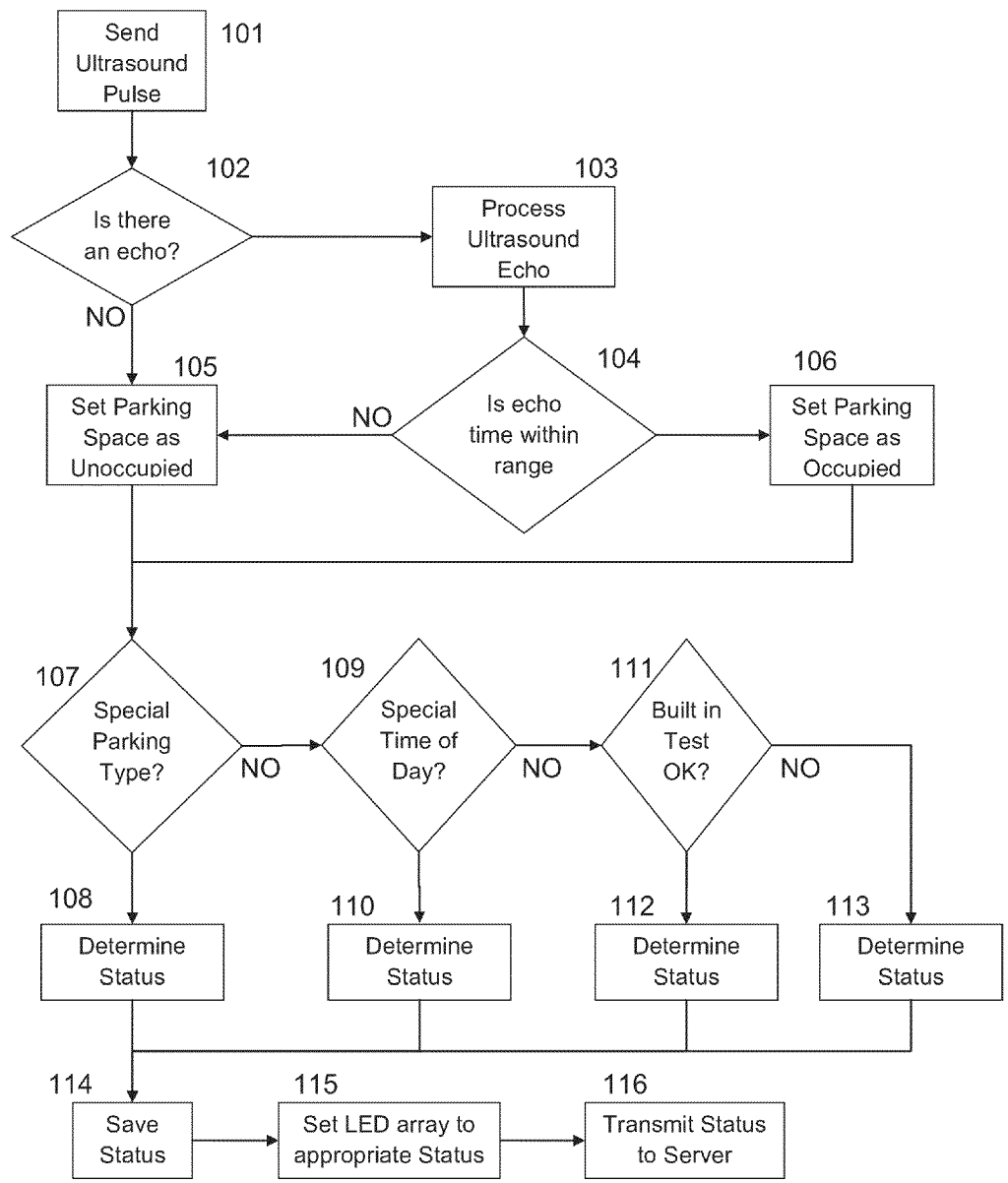
FIG. 1 is a flowchart of the method for determining the status of a parking space.

The present invention, in some embodiments thereof, relates to motor vehicle parking and, more particularly, but not exclusively, to parking space monitoring and/or notification.

According to some embodiments of the present invention, there are provided methods and devices and systems for monitoring one or more parking space(s) and/or notifying drivers if the one or more spaces are occupied by a motor vehicle or available for parking. The methods and devices and systems may use an ultrasonic transceiver (UST) to detect if a car is parked in the space it is monitoring by sending an ultrasonic pulse in a trajectory angled at the parking space, receiving the reflected echo from a parked vehicle, and measuring the echo time between the sent pulse and received echo. This echo time may be compared to a preconfigured range of echo times that correspond to an indication that a vehicle is parked in the parking space. Optionally, the echo time and preconfigured range of echo times are transformed into distance units. The UST may detect the occupancy of a parking space within range of the UST component, for example at a distance of up to 4 meters from the parking space, by calibration of the UST and the corresponding echo time and/or distance range. For example, the UST may be positioned immediately adjacent to the parking space, 0.5 meters from the parking space, 1 meter from the parking space, 2 meters from the parking space, 3 meters from the parking space, 4 meters from the parking space, up to the maximum detection distance of the UST component.

Optionally, the parking space is designated as handicapped and/or for drivers with children and the corresponding status of the parking space set. An array of multicolored light emitting diodes (LED) may be used to notify drivers of the availability and/or status of the parking space.

Optionally, the UST component is located within a recess in the device housing so as to protect it from damage by vehicle tires.

Optionally, the device can monitor more than one parking space using more than one UST component.

According to some embodiments of the invention, radio frequency (RF) broadcast electronics are incorporated into the device and methods to allow transfer of the parking space status data to internet servers for remote status display and/or web-based and/or mobile phone-based application access. The RF electronics may communicate the parking space status data to routing controllers with compatible RF electronics. The routing controllers may include devices, protocols and methods that relay the data from the parking monitor devices to internet servers using Ethernet, Wi-Fi, near field communication, cellular data transfer and/or other communication infrastructures.

Optionally, the parking space status is transferred to indicators and/or signs and/or displays to help the drivers find available parking spaces.

According to some embodiments of the present invention, the parking space status is transferred to one or more internet servers and the parking status data may be used by parking lot managers, municipal parking administrators, and/or parking violation enforcement officers. For example, parking administrators can use the parking status data for planning more parking spaces in areas of high parking need. Optionally, the visual LED array and/or an internet server and/or the routing controller is used to notify parking violation enforcement officers of a parking violation.

According to some embodiments of the present invention, the device and method are suitable for monitoring of many types of parking locations. For example, the device is located on the floor or ceiling of closed parking facilities, or is located on the ground in open parking facilities or for street parking. The device may be powered by one or more batteries, transfer parking states wirelessly, and attached near the parking space with glue to enable convenient application of the methods.

The method and device may enable drivers to save time in locating an available parking spot, and parking administrators to monitor parking space usage as well as direct parking enforcement officer to vehicles that are in violation of parking codes. Drivers looking for parking spots may use the invention to reduce time and gas expenses in finding parking spaces, as well as reduce the stress associated with locating an available parking spot. Parking lot owners and/or managers may use the invention to obtain real time and/or historic data of the parking space occupancy, maximize their profitability, increase the availability of parking spaces, and increase customer satisfaction do to greater ease in finding a parking space. Municipal parking space managers may use the device to reduce traffic, reduce the pollution from vehicles searching for parking, provide real time and/or historic data of the parking space occupancy for planning, increase availability of parking spaces in retail areas, maximizing the profitability of parking revenues, and increase revenues from parking violations. For example, the invention may direct municipal parking enforcement officers to the locations of illegally parked vehicles, vehicles in violation of parking codes, vehicles parked over the allowable time limit, or vehicles that have not paid the appropriate parking fees, and thus improve the efficiency of parking violation enforcement.

Before further explaining some embodiments of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is one example of a flowchart of a method for determining the occupancy and status of a parking spot. Occupancy of a parking spot may be occupied or unoccupied, and status of a parking spot takes into account the occupancy and/or configuration data and/or time of day and/or built in self test results to determine the status of the parking space, for example if the parking spot is available and who may park there. As shown at 101, the method begins by sending an ultrasound pulse towards the direction of a possible vehicle or object occupying the parking space. If there is a vehicle or object in the parking space, as shown at 102, the transceiver will detect an echo reflected off this object and this echo will be received by transceiver and processed by one or more processing unit. Based on the time between the transceiver sending the pulse and receiving the corresponding echo back, an echo time and/or distance may be measured as at 103. If this echo time and/or distance is within a predefined range that corresponds to an echo from a parked vehicle as at 104, the parking space will be designated as occupied 106. For example if an echo is reflected back from the roof of a parking garage or the building behind the street parking space the echo time will be outside the predefined range and the parking space designated as unoccupied 105. Similarly, if no echo is received then there is no object in the space and the parking space designated as unoccupied 105. Before setting the status of the parking space the method further checks the predefined type of parking space 107, the time of day 109 and/or performs a built in test as at 111 to check the operation of the device and/or whether the device needs maintenance. Together, these data determine the status of the parking space as at 108, 110, 112 and 113 in order to save it as at 114. This saved status is used to set the LED array to the appropriate light pattern 115 and optionally, transferred to a routing controller and/or internet server for further use by potential users as at 116.

According to some embodiments of the present invention, the method stores the occupancy, permission, time, and status data in the processing unit's random access memory and/or non-volatile memory as needed. The stored data may be transferred wirelessly to a routing controller and/or internet server and/or other user. The stored data may be displayed visually through the use of light emitting diode arrays on the device and/or other displays such as signs and/or boards to help the drivers locate available parking spaces. The data stored for occupancy may be occupied or vacant. The data stored for permission may be all, reserved, handicapped, rush hour, metered, bus lane, bus stop, loading/unloading, short term parking, pickup/dropoff and the like. The data stored for time may be loading times, bus running times, metered parking times, metered parking time limits, vehicle start parking time, rush hour time, school dropoff/pickup time, short term parking time, and the like. The time information for each type of time may include time, date, day of week, day of month, day of year, and the like. The time information may include multiple times for each type, as well as repetition times for each type. Together, this time data may allow the configuration of all possible types of parking statuses. For example, during business hours a parking space may be designated as a status of loading/unloading, but after a certain time of day may be available for metered parking. Another example is that during rush hour the parking lane may be used as a driving lane, and then later in the day used for street parking. These time data may be configured into the device during installation and/or modified at later time by RF communication, and may allow municipal street and parking administrators to configure the parking space for any possible use. This may allow the municipality to avoid the expenses of marking street curbs with paint to designate the type of parking allowed, the expenses of placing signs at the beginning of each type of parking zone, optimization of each type of parking space dynamically to better serve the users and stakeholders, and save time and expenses of the court systems in enforcing the parking regulations. Optionally, the device may use the data and communicate with users via the RF electronics incorporated into the device, the routing controller as a standalone device, and/or the internet server.

Optionally, the device and/or internet server and/or the routing controller may perform the function of a parking meter for the designated parking space, saving the municipality the additional expenses of a parking meter installation and maintenance. Optionally, new time types and permissions of a parking space me be defined and transferred to the device. The status of the parking space is determined by predefined logic in the processing unit based on the occupancy, permission, and time type of the parking space. Optionally, the logical algorithms are changed at any time by RF communications. The status types that may be determined are available for all, not available, occupied, reserved, available for handicapped, loading/unloading, short term parking, vehicle moved, no parking, available for parents, dropoff/pickup, and the like. All and/or part of the data available on the device and/or routing controller may be displayed visually using light emitting diode arrays, such as using different colors, shapes and blinking patterns. All and/or part of the data available on the device and/or routing controller may be transferred to the internet server for further use. For example, the device ID, permission, meter payment, meter payment time, meter parking limit, status, and vehicle start parking time may be transferred to the internet server for monitoring the parking meter payment and possible notification to the vehicle driver and/or enforcement officer of a violation. The location of the parking space and/or device may be stored on the internet server as well as and used by the internet server to direct vehicles to available parking spaces, with or without the use of GPS and/or GPS-like applications and/or devices. For example the internet server can provide the available parking space data to Goggle Maps and/or Waze and/or Bing and/or any other mapping internet application and/or servers to assist in vehicles reaching the available parking spaces.

Figure 19:
FIG. 19 is an illustration of some embodiments of the device in a parking lot with a sign showing direction of available parking spaces.

Reference is now made to FIG. 19, which is an illustrative example of sign and/or display that assists the driver in locating available parking spaces in a parking lot and/or parking structure in some embodiments of the invention. When a parking space becomes available as at 1901 the sign may indicate the direction and/or location and/or quantity of the available parking spaces as at 1902.

Figure 17:
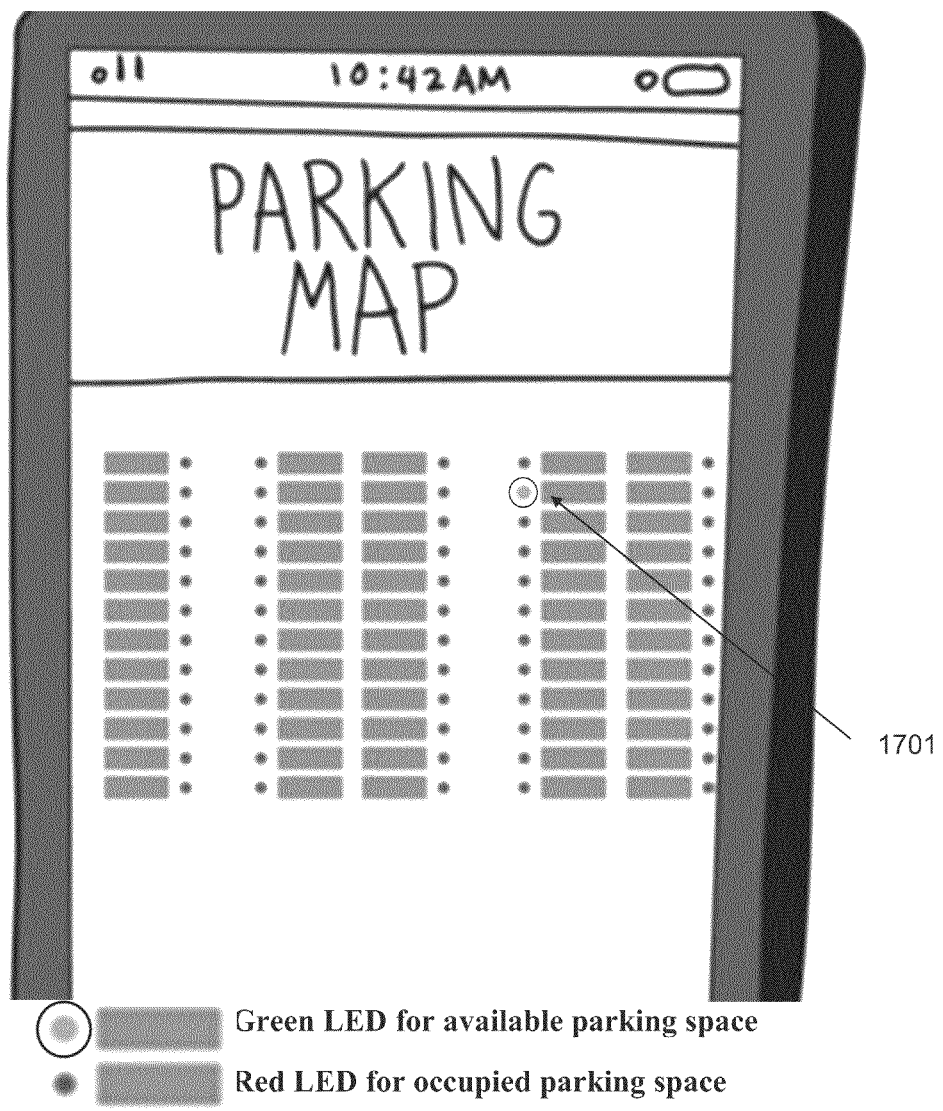
FIG. 17 is an illustration of some embodiments of a mobile phone application showing free parking spaces.

Reference is now made to FIG. 17, which is an illustrative example of a mobile phone application that assist the driver in locating available parking spaces in a parking lot and/or parking structure in some embodiments of the invention. The mobile phone application will display a diagram of all parking spaces and indicate in green the parking spaces available as at 1701.

Figure 20:
FIG. 20 is an illustration of some embodiments of mobile phone applications showing the locations of free parking spaces.
Figure 20:
Figure 20:
Figure 20:
Figure 20:

Reference is now made to FIG. 20, which is one illustrative example of a mobile phone application for finding a parking spot. Using a geographical map application, the parking space may be displayed using an icon as at 2003 to help the driver navigate the vehicle to the parking space. Optionally, the mobile phone application can assist the driver in paying the parking fee, monitoring the vehicle against unauthorized movement and/or vandalism, assist the driver of the vehicle find their vehicle when they are ready to leave the parking space, and the like. When used in a parking lot structure, the mobile phone application can display an illustration of the parking lot spaces, indicating as at 2001 the parking spaces available for general parking, or for example indicating the location of handicapped parking as at 2002. Optionally, the availability of street parking and/or parking lot spaces can be displayed on billboards and/or signs.

Figure 5:
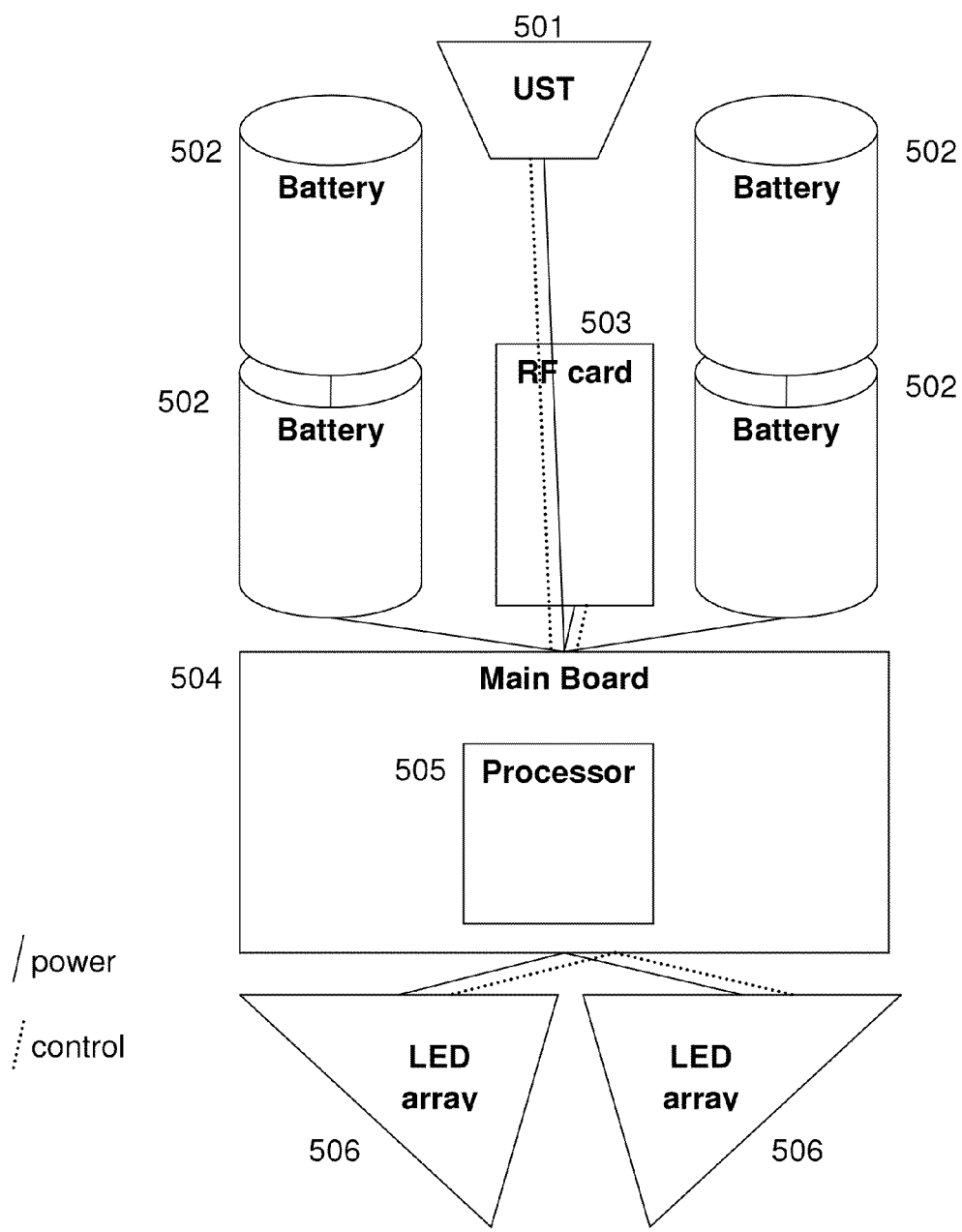
FIG. 5 is a physical distribution of the device components in some embodiments of the invention.

Reference is now made to FIG. 5, which shows the distribution of device components in some embodiments of the invention. According to some embodiments of the present invention, the device may be fully self contained and includes cavities for at least one primary lead-acid, primary alkaline, primary Li-ion or rechargeable batteries and/or battery pack 502 which supply power to the main board as at 504 and from the main board to the other peripherals such as processor as at 505, UST as at 501 located within a recess of the device housing, LED arrays as at 506, and RF electronics as at 503. There may be additional wires between the main board and the peripheral devices to provide data communication and control of the peripheral components, as shown by the dashed lines. The device may be attached to the roadway using asphalt anchors and/or concrete anchors and/or glue to fasten the device onto the road or structure within UST detection range of the parking space. The device housing design may be Ingress Protection Rated to IP67 to withstand outdoor use, by including an integrated o-ring seal between the two halves of the housing. Optionally, the housing is designed to withstand rollover vertical and/or sheer stresses from all motor vehicles including large trucks through integrated internal structural elements surrounding the internal electronics that transfer forces from the top of the housing to the pavement.

Figure 6:
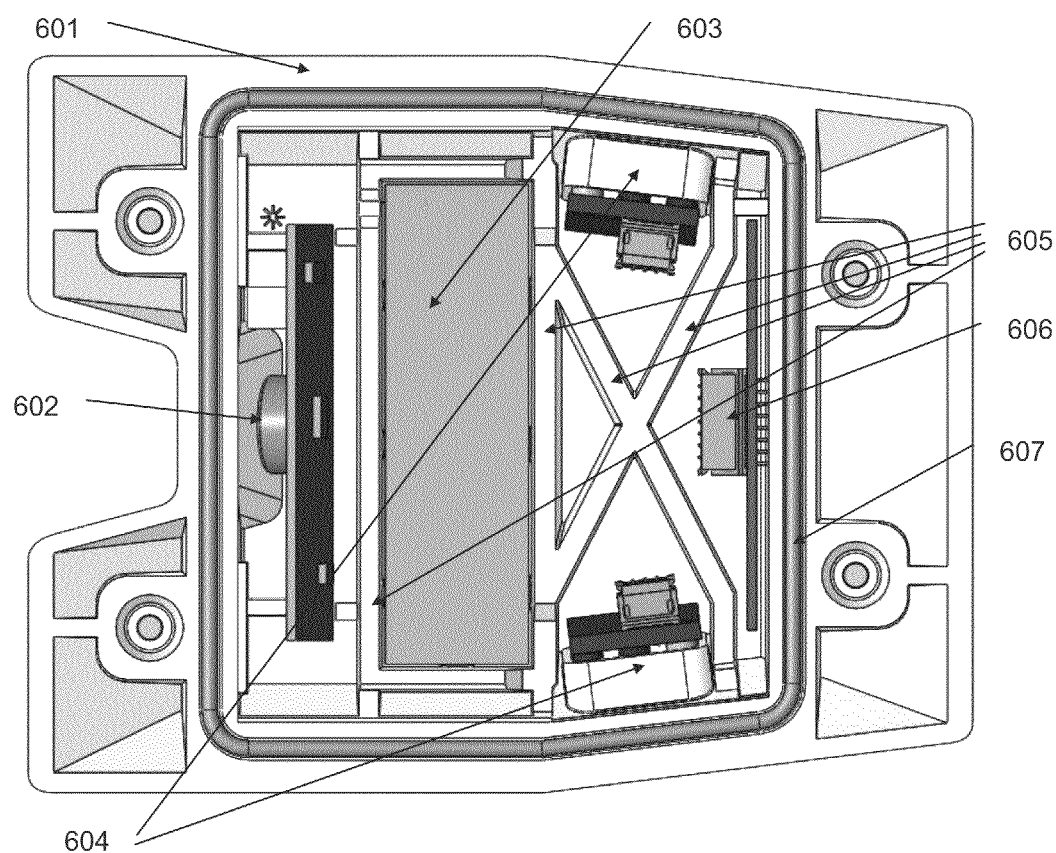
FIG. 6 is an illustration of the interior of some embodiments of a device powered by a CR2477-size coin battery pack that monitors a parking space and notifies drivers of the parking space status showing the internal structural elements.

Reference is now made to FIG. 6, which is an illustrative example of the interior of a device in some embodiments of the invention. The housing of this device as at 601 contains and protects the main board with the processing unit as at 606, which may include an optional RF electronics broadcasting card. Also within the housing are the LED arrays as at 604 for notifying the parking space status to users, and CR2477 size battery pack used to power the device as at 603. At the rear of the device in the direction of the parking space is the UST 602 which is pointed in a trajectory so as to detect the occupancy of the parking space. The trajectory may include both an angle relative to the ground and an angle relative to the street axis. Shown are the main structural elements as at 605 that may support the weight of vehicles that drive over the housing without damage. Also shown is the o-ring as at 607 that provides a waterproof enclosure for the electronics inside.

Figure 7:
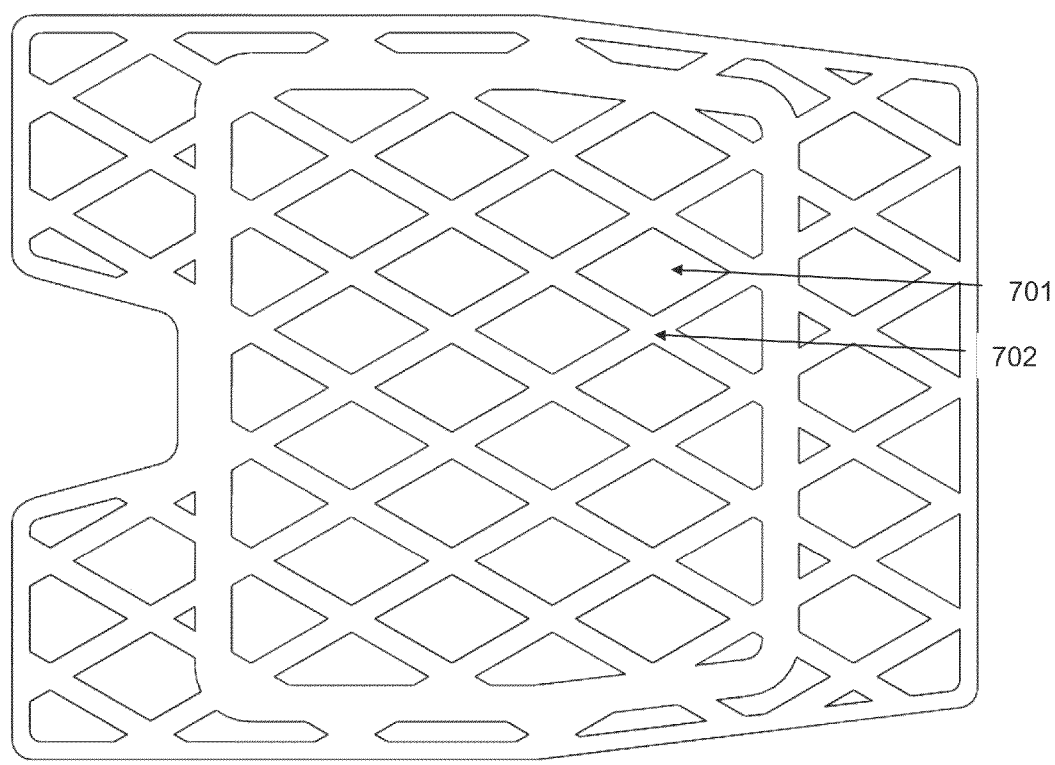
FIG. 7 is an illustration of the bottom of some embodiments of a device powered by a CR2477-size coin battery pack that monitors a parking space and notifies drivers of the parking space status showing the external road footprint.

Reference is now made to FIG. 7, which is an illustrative example of the bottom of a device in some embodiments of the invention. The footprint on the bottom side of the housing may include depressions as at 701 to increase adherence of the device to the attached road or structure it is attached to, and ridges as at 702 to transfer the force from the weight of a vehicle directly to the roadway and avoid structural damage to the housing.

Figure 8:
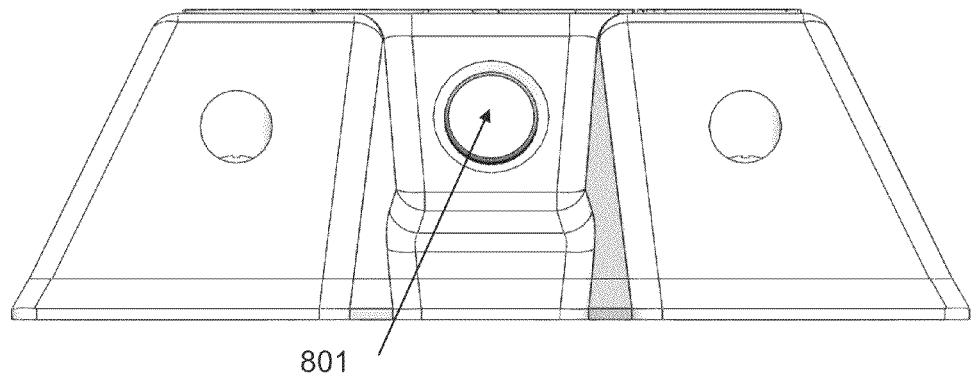
FIG. 8 is an illustration of the side view from the parking space of some embodiments of the a device.
Figure 9:
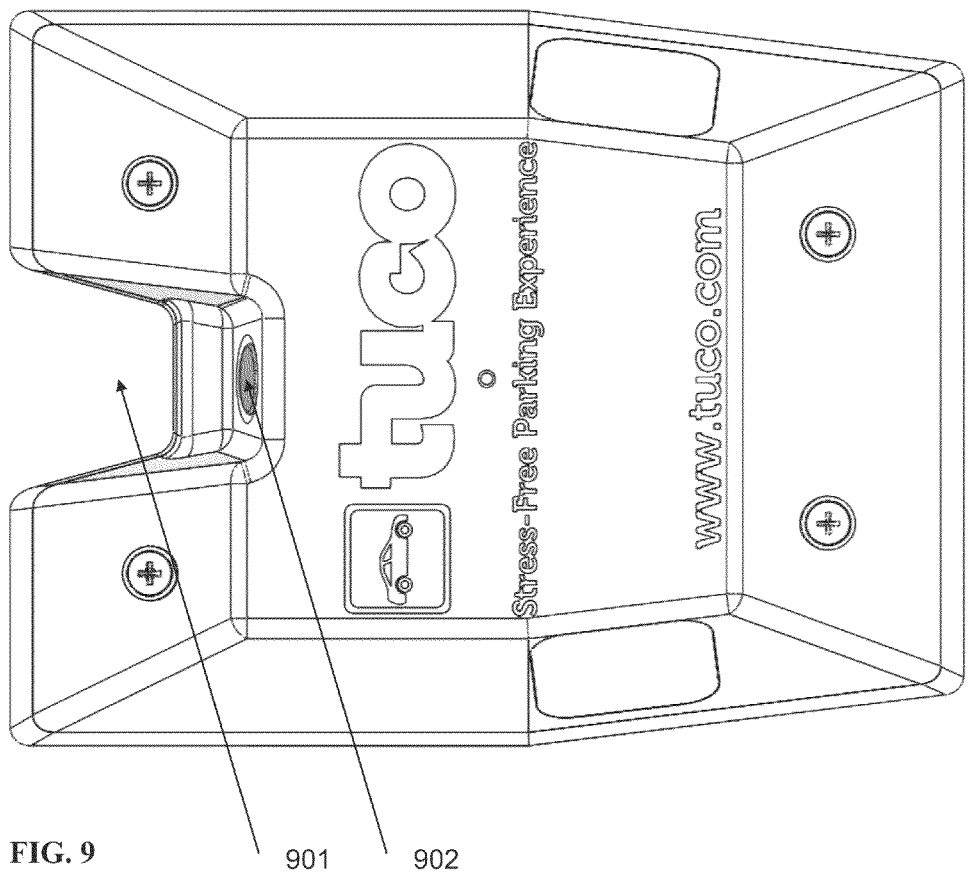
FIG. 9 is an illustration of the top view of some embodiments of a device.

Reference is now made to FIG. 8 and FIG. 9, which are illustrative examples of a device in some embodiments of the invention. The UST as at 801 is angled in a trajectory towards the parking space so as best to detect the occupancy of that parking space. The UST as at 902 may be located within a recess as at 901 to protect it for damage.

Figure 10:
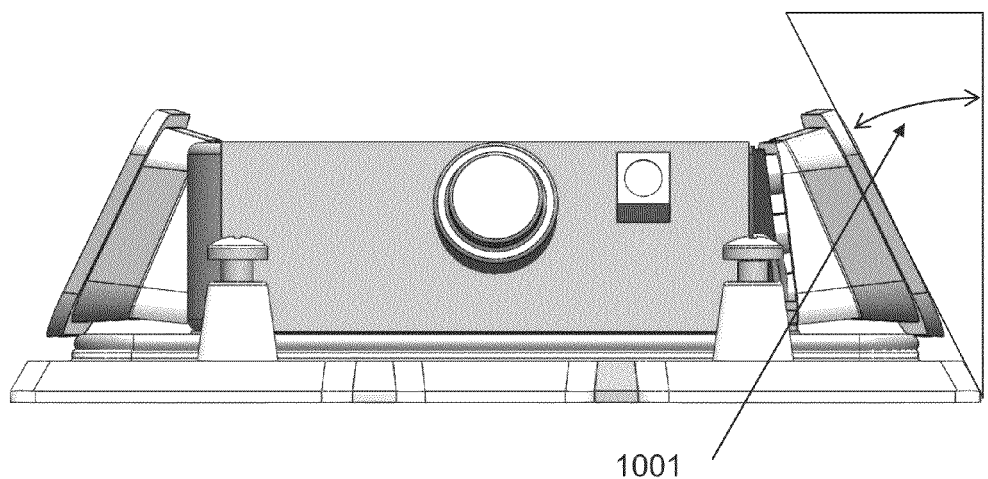
FIG. 10 is an illustration of the side view from the parking space of some embodiments of the internal device components.
Figure 11:
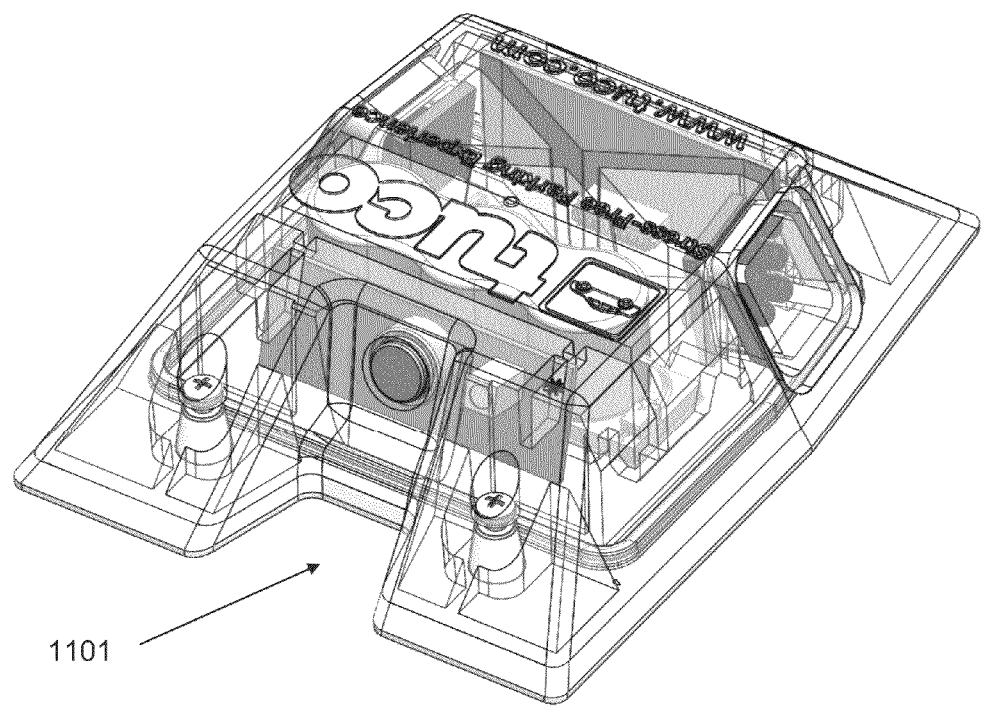
FIG. 11 is an illustration of an isometric view of some embodiments of the a device.
Figure 12:
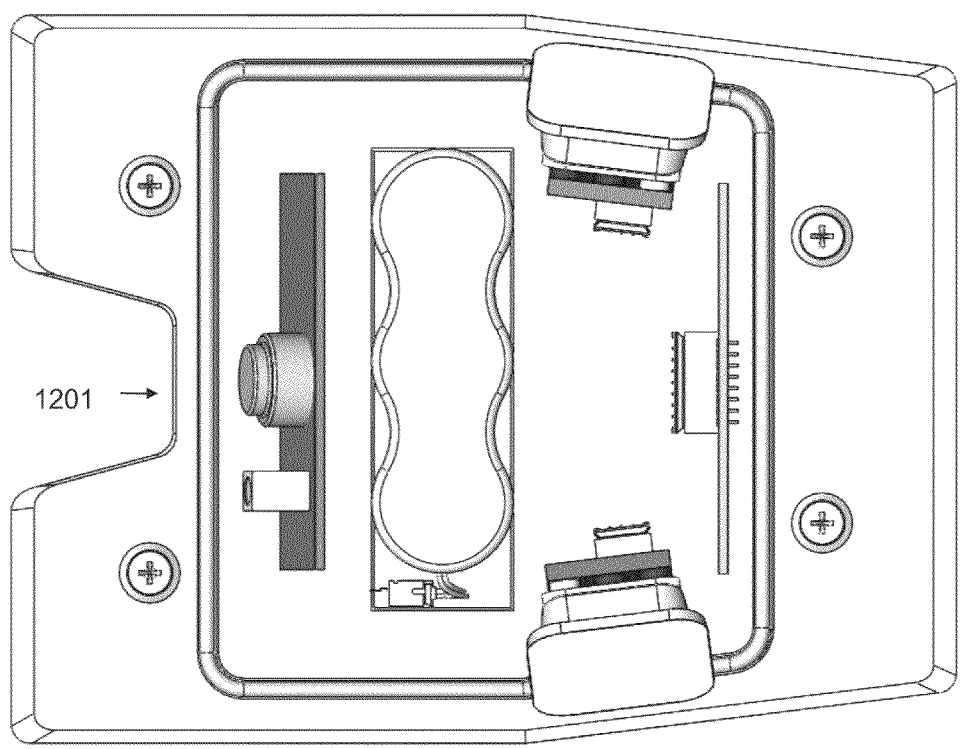
FIG. 12 is an illustration of the top view of some embodiments of the internal device components.
Figure 13:
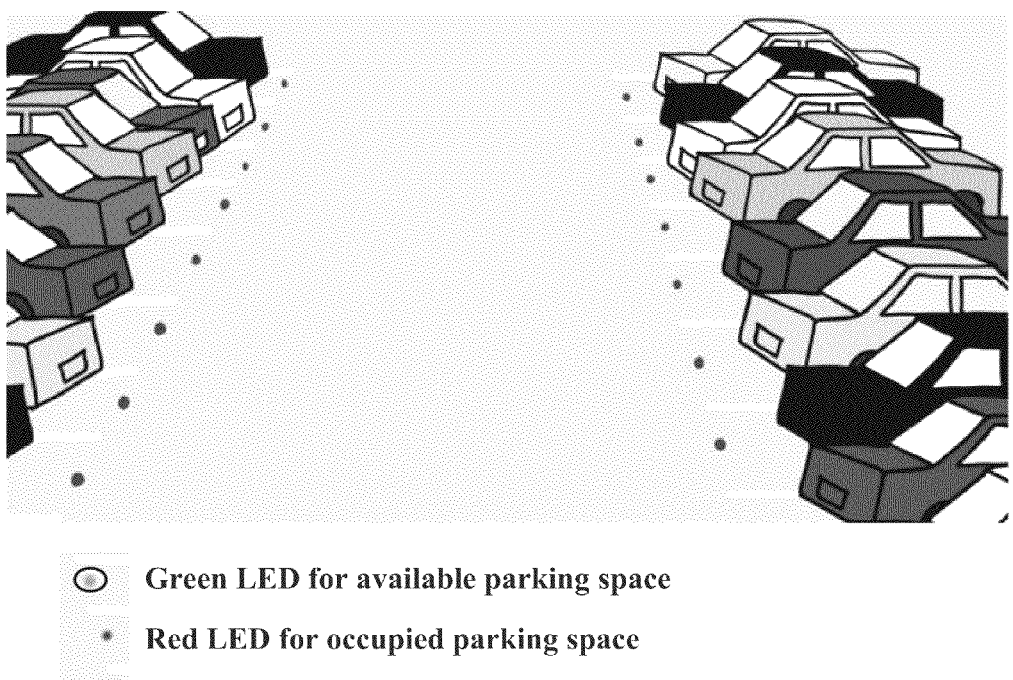
FIG. 13 is an illustration of some embodiments of the device and parking spaces as seen by a driver in a parking lot.
Figure 14:
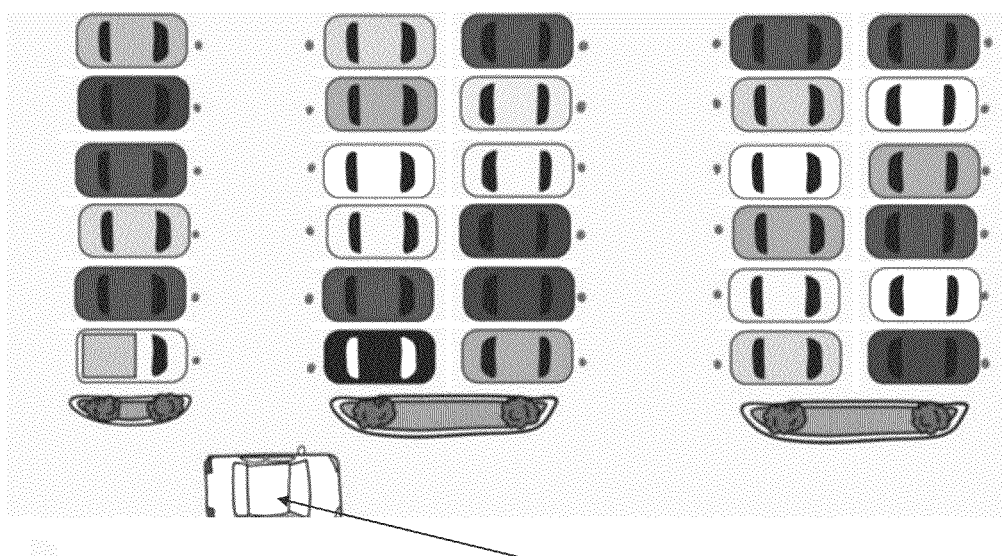
FIG. 14 is an illustration of some embodiments of the device and parking spaces in a parking lot as seen from above.
Figure 15:
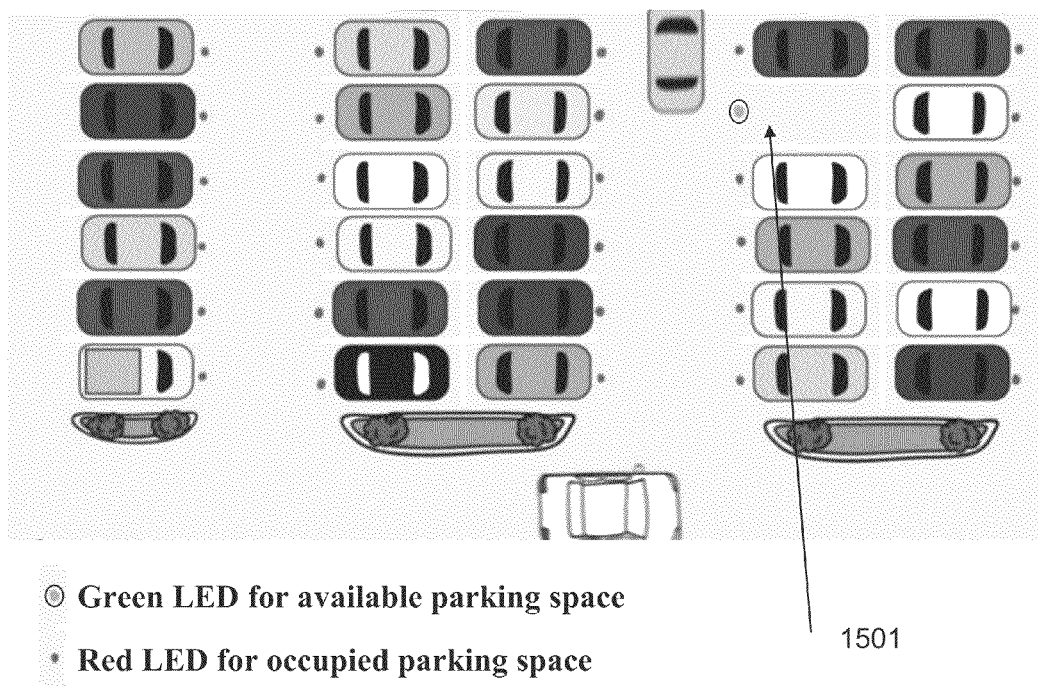
FIG. 15 is an illustration of some embodiments of the device and parking spaces in a parking lot as seen from above.
Figure 16:
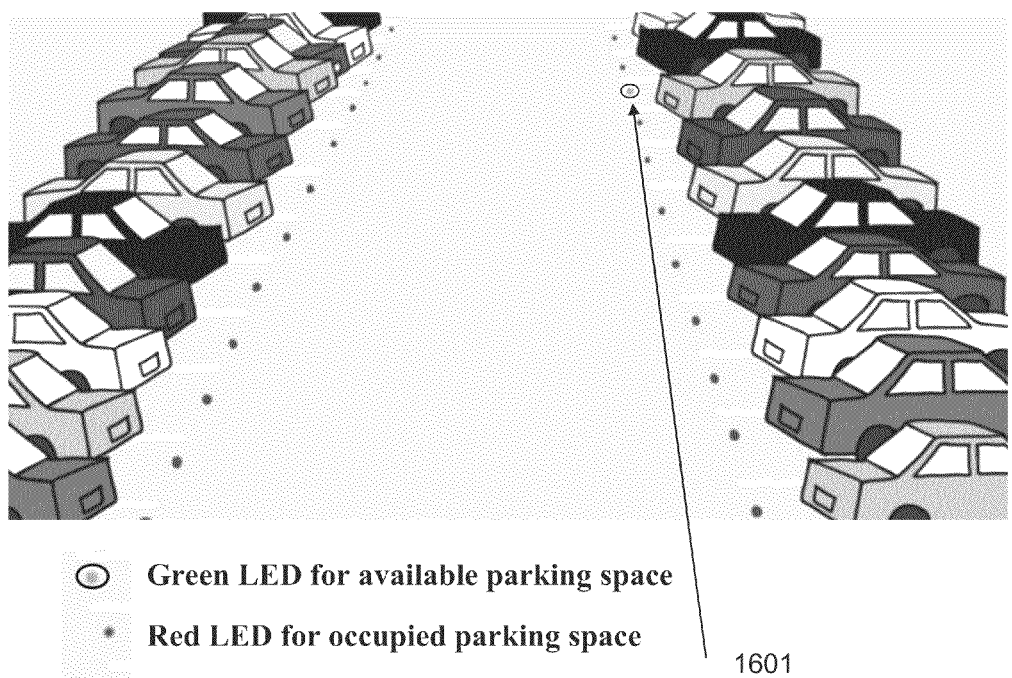
FIG. 16 is an illustration of some embodiments of the device and parking spaces as seen by a driver in a parking lot.

Reference is now made to FIG. 10, FIG. 11 and FIG. 12, which are illustrative examples of a device in some embodiments of the invention. The LED array is positioned at an angle as at 1001 so as to be better visible to drivers in the vicinity of the device. The UST is protected by a recess in the device housing as at 1101 and 1201.

Optionally, the complete LED array and/or each LED array element includes a lens to better focus the light form the LED in the direction of the road axis.

Optionally, power supply batteries and/or one or more battery packs are of any shape and/or size, including but not limited to, round, rectangular, or coin types. For example, power is supplied using one or more round shape batteries of size AAA, AA, C, D, and/or CR123. One example of coin shape batteries is CR2477 size batteries. Optionally, multiple sizes batteries may be incorporated in battery cavities and/or in one or more battery packs. Optionally, the batteries use soldered connections to transfer power to electronic circuits. Optionally, a combination of primary and rechargeable batteries may be used. Optionally, at least one of the batteries in the device may be used as a backup battery to notify that the regular usage batteries are depleted.

Optionally, the top side of the device may be covered with photovoltaic cells to recharge at least one internal rechargeable battery.

Optionally, the device may be set to power save mode remotely using the RF electronics communication. Further optionally, the device may be set to power save mode remotely using the internet server described herein.

According to some embodiments of the present invention, the UST shall emit an ultrasonic pulse periodically, for example every 5 seconds, to detect if there is a vehicle parked in the parking space being monitored. This ultrasonic pulse may be reflected off a parked vehicle and received by the UST for measurement of the echo time. The echo time may be converted to a distance to the object and if this distance is within an allowed range, for example between 0 to 400 centimeters, may indicate the parking space is occupied. Optionally the ultrasonic pulse can be emitted at faster or slower rate.

Reference is now made to FIG. 13, FIG. 14, FIG. 15 and FIG. 16, which are illustrative examples of locations of the device in relation to parking spaces in a parking lot and/or parking structure in some embodiments of the invention. When a driver as at 1401 is looking for a parking space and there are no parking spaces available in the vicinity, all LED arrays on the associated devices will display a red LED color. When a parking space becomes available a green LED color will be displayed by the LED array of the device next to the available parking space as at 1501 and 1601.

Figure 22:
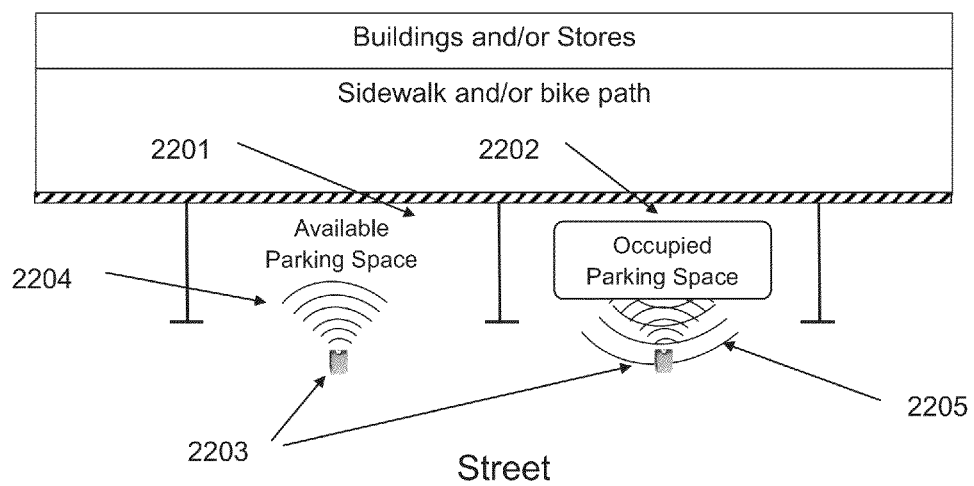
FIG. 22 is an illustration of some embodiments of the device showing the location of the devices relative to the parking spaces and their operation.

Reference is now made to FIG. 22, which is an illustrative example of the location of devices in relation to parking spaces for street parking in some embodiments of the invention. The device as at 2203 is positioned within UST detection range of the parking spaces as at 2201 and 2202. The device sends a pulse in a trajectory towards the parking space as at 2204, and if there is no vehicle as at 2201 then no echo is reflected from the vehicle. If there is a vehicle occupying the parking space as at 2202, then an echo will be reflected off the vehicle as at 2205 and captured by the UST component of the device.

Optionally, the UST board contains multiple sending and receiving components, such that multiple parking spaces may be monitored by the same device. For example two transducers may be used with different trajectories appropriate for monitoring two parking spaces. Another example would be a phased array of wide-angle transducers that can collect phase information from the corresponding echoes and using phase and amplitude processing determine the occupancy of multiple parking spaces. These multiple parking space devices can lower total system costs and still notify drivers of motor vehicles of an available parking space in the close vicinity of the device. Once the driver arrives in the close vicinity of the device they may locate the parking space by direct observation.

Optionally, the ultrasound pulse trajectory is at a vertical and horizontal angle to the parking spot so as to best detect the presence of a vehicle in that spot. Further optionally, the angle of the ultrasound pulse trajectory can be varied during installation to improve the detection of a vehicle in the assigned parking spot.

Optionally, one device can monitor two adjacent parking spots using two UST components located within recesses of the device housing at adjacent corners of the device housing. Each UST component is angled at a trajectory in the direction of the adjacent parking spaces and positioned during installation towards each parking space to improve the detection of a vehicle.

Figure 23:
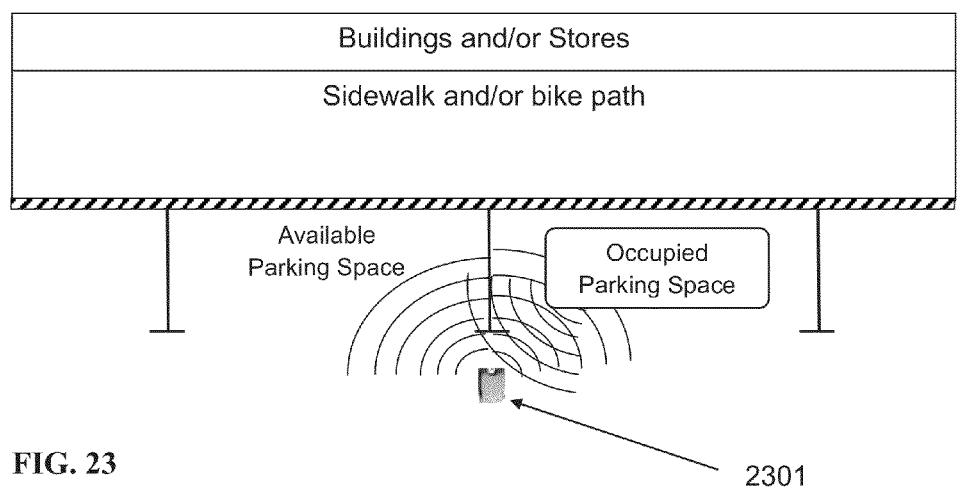
FIG. 23 is an illustration of some embodiments of the device showing the location of a device relative to the parking spaces for a single device monitoring two adjacent parking spaces.

Reference is now made to FIG. 23, which is an illustrative example of the location of a device for monitoring two adjacent parking spaces in some embodiments of the invention. The device as at 2301 is positioned within UST detection range of both parking, for example in between two adjacent parking spaces. The device sends a pulse in a trajectory towards each parking space, and if there is no vehicle in the associated then no echo is reflected from the vehicle. If there is a vehicle occupying either of the parking spaces, then an echo will be reflected off the vehicle and captured by the UST component of the device. The UST components of the device may be located on the corners of the device so as to achieve a suitable trajectory towards both parking spaces, with each UST component being located within a recess on each of two adjacent corners of the device in the direction of the parking spaces. When a driver sees from a distance that one of these parking spaces is available he can park in the available parking space on arrival to the street adjacent to the parking spaces.

Optionally, one device may contain two UST devices to monitor two parking spots on opposing sides of the device so that the device is placed in the center of the street and monitors two parking spaces on opposing sides of the street.

Figure 25:
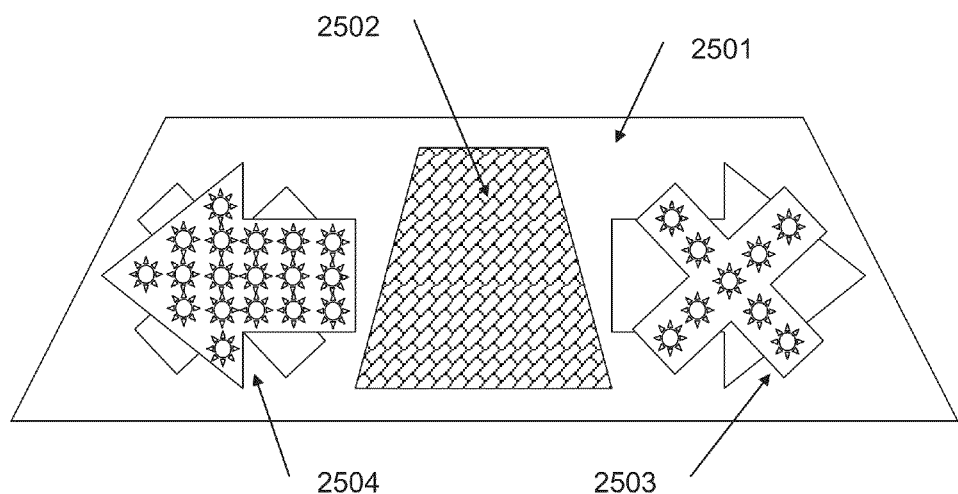
FIG. 25 is an illustration of some embodiments of the device showing a side view of a single device monitoring two parking spaces on opposing sides of the street.

Reference is now made to FIG. 25, which is an illustrative example of the side view of a device for monitoring two parking spaces on opposing sides of the street in some embodiments of the invention. The driver looking down the street may see two LED arrays and a safety reflector in the middle as at 2502. When the parking space is occupied the associated LED array on the side of the device towards the associated parking space may display a red "X" shape as at 2503. When the parking space is available the associated LED array on the side of the device towards the associated parking space may display a green arrow shape as at 2504.

Optionally, other LED array shapes can be used to indicate the status of a parking space.

Figure 26:
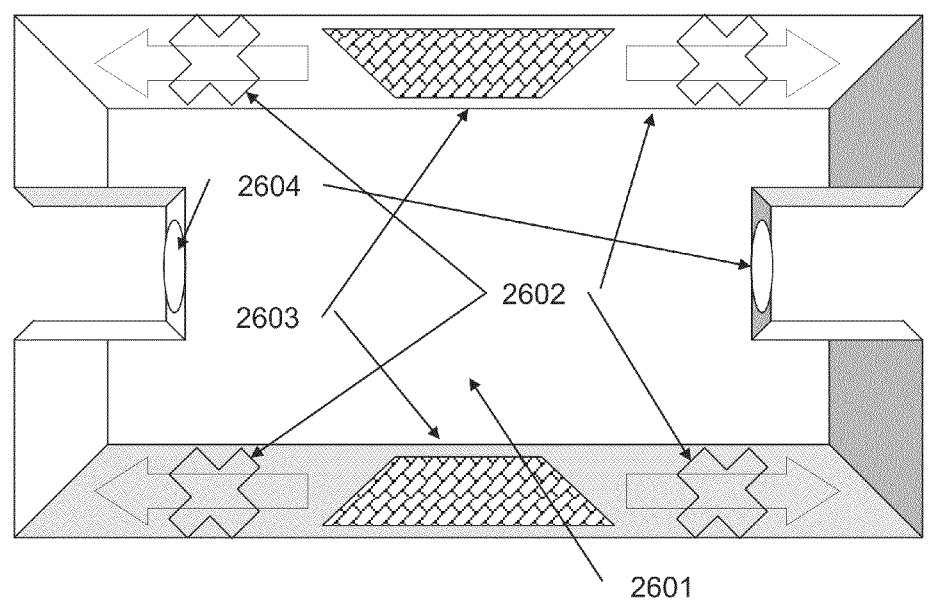
FIG. 26 is an illustration of some embodiments of the device showing a top view of a single device monitoring two parking spaces on opposing sides of the street.

Reference is now made to FIG. 26, which is an illustrative example of the top view of a device for monitoring two parking spaces on opposing sides of the street in some embodiments of the invention. The driver looking down the street may one side of the device with two LED arrays as at 2602 and a safety reflector in the middle as at 2603. The UST components as at 2604 are located within recesses of the device housing.

Figure 24:
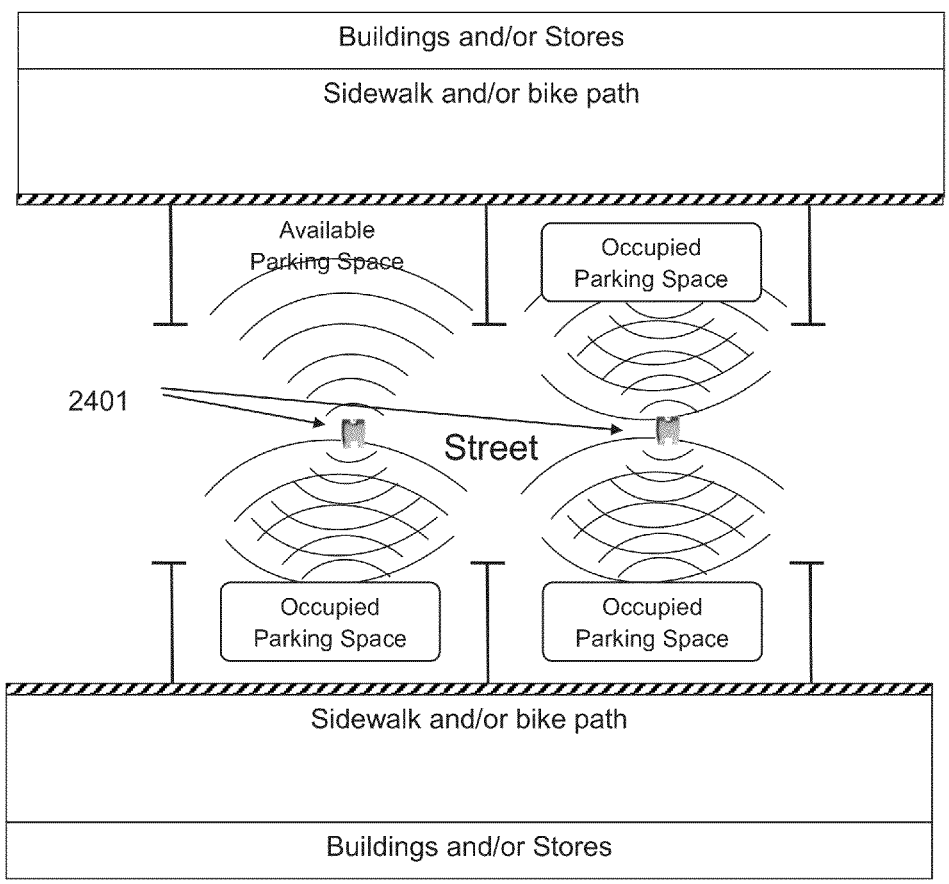
FIG. 24 is an illustration of some embodiments of the device showing the location of the devices relative to the parking spaces for single devices monitoring two parking spaces on opposing sides of the street.

Reference is now made to FIG. 24, which is an illustrative example of the location of a device for monitoring two parking spaces on opposing sides of the street in some embodiments of the invention. The device as at 2401 is positioned within UST detection range of both parking spaces, for example in the middle of the street. The device sends a pulse in a trajectory towards each parking space, and if there is no vehicle in the associated then no echo is reflected from the vehicle. If there is a vehicle occupying either of the parking spaces, then an echo will be reflected off the vehicle and captured by the UST component of the device. The UST components of the device may be located on opposing edges of the device so as to achieve a suitable trajectory towards both parking spaces, with each UST component being located within a recess on each of two opposing sides of the device in the direction of the parking spaces. When a driver sees that one of these parking spaces is available he can park in the available parking space on arrival to the street adjacent to the parking spaces.

Optionally, the device comprises three UST components on each side of the device, for a total of six UST components to monitor six parking spaces in the associated trajectories. One UST component may be located in a recess on each corner of the device and two UST components may be located on opposing sides of the device.

Optionally, one transceiver can monitor two parking spots by either alternating the trajectory angle electronically, or processing a fan-beam type ultrasound pulse.

According to some embodiments of the present invention, the LED array may contain multiple colored LEDs to provide color information to drivers. For example, if the parking space is occupied, the LED array would emit red light, and if the parking space is available, it would emit green light. Optionally, the emitted light can be displayed in multiple combinations of blinking patterns and/or LED colors to indicate different statuses. Another example would be if the parking space is designated as a handicap parking space and is available, the LED array would emit blue light. Another example is when the LED array would emit yellow light to indicate the parking spot is reserved. Another example is when the LED array would emit purple light to indicate the parking spot is available and reserved for parents with children, such as in front of schools during school dropoff and/or pickup times. Another example is when the LED array would emit alternating red and blue lights to indicate the parking spot is reserved for loading and/or unloading. If the device requires maintenance then the LED array may emit a certain pattern that indicates a general error of the device. Optionally, the LED array may emit a certain pattern of light colors for each specific type of error. For example, when a battery is low and needs replacing the LED array will flash red light.

Optionally, the LED array may flash to conserve battery power and/or show different status indications. Such flashing may include different flash rates and/or duty cycles for the drivers to identify different notifications regardless of their color perception, enabling color blind drivers to utilize the information.

Optionally, the LED array will emit light in patterned shape to indicate to drivers the direction of a nearby parking space.

Optionally, the device will comprise a plurality of LED arrays for monitoring multiple parking spaces.

Optionally, the LED array will not emit any light when the spot is occupied to conserve power in high traffic areas.

Optionally, the device may enter power save mode when any of the following states occur: no vehicle activity nearby, no vehicle activity in parking spot, low light level, and/or current time within a predefined time window. For example, when the roads are covered with snow, the system enters power save mode. Another example might be that overnight the system enters power save mode if there is no vehicle activity in the parking spot.

Optionally, the device may exit power save mode when receiving a command from the routing controller and/or internet server.

According to some embodiments of the present invention, the RF electronics enable communication of parking space status to an internet server for access by drivers, administrators, and/or officers. This information may be used by vehicle drivers through web, vehicle and/or mobile phone-based applications. Another example would be when municipal officials and/or parking managers use the data through web and/or computer-based applications for planning and reporting purposes. Optionally, municipal parking enforcement officers would use the data through parking enforcement wireless devices to locate vehicles that are in violation of municipal parking codes.

Figure 21:
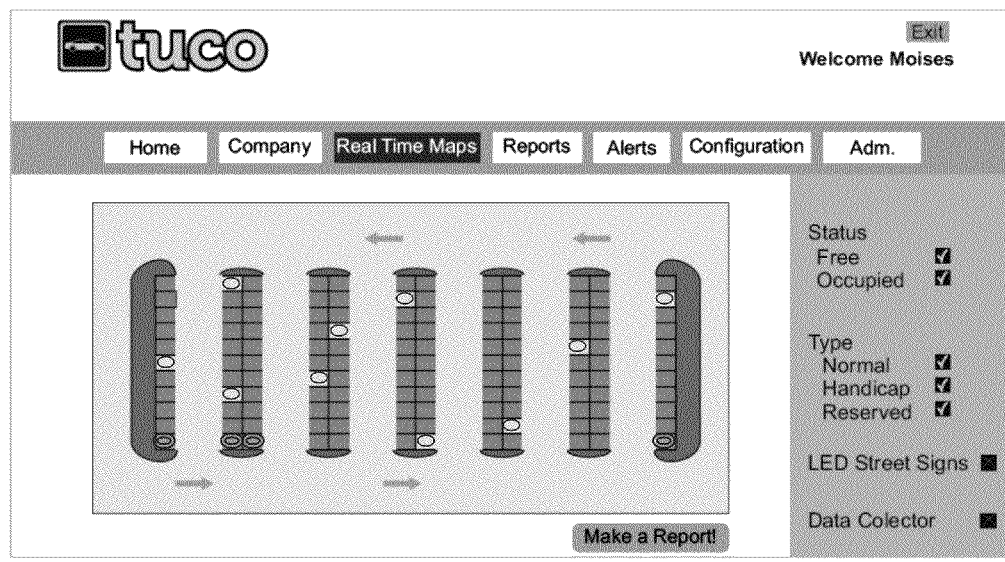
FIG. 21 is an illustration of some embodiments of management tool application showing the locations of free parking spaces.

Reference is now made to FIG. 21, which is an illustrative example of parking manager application to assist management of parking spaces in a parking lot and/or parking structure and/or street parking in some embodiments of the invention. The application will display a diagram of all parking spaces and indicate in green the parking spaces available, or optionally indicate handicapped parking spaces. If the manager wishes to produce a report and/or view historical data about parking space usage they may do so using the appropriate user interface controls.

Optionally, these RF electronics use a broadcast frequency of 2.4 GHz to communicate with routing controllers.

The routing controllers and/or internet servers may further facilitate payment of parking fees through a local user interface, web interface, mobile phone applications, or voice-menu system. Optionally, the device remembers where parking space location and assists the driver in finding their vehicle. Optionally, the parking space device may monitor parked vehicle and the internet server associated with this device may notify the owner if vehicle has been moved before the owner and/or driver has finished using the parking space, such as if the vehicle is towed by a parking violation officer or stolen. Optionally, the internet server may notify driver if he is in violation of parking codes. Such notifications to a driver of the parked vehicle may be done through a mobile phone application, SMS message, email, and/or phone call. The internet server may communicate with motor vehicle drivers looking for a parking space through a global positioning system or smartphone device that indicates to the driver the possible parking locations in the vicinity of the driver's destination, and may reserve one or more of those available parking spaces for the driver's use.

Figure 2:
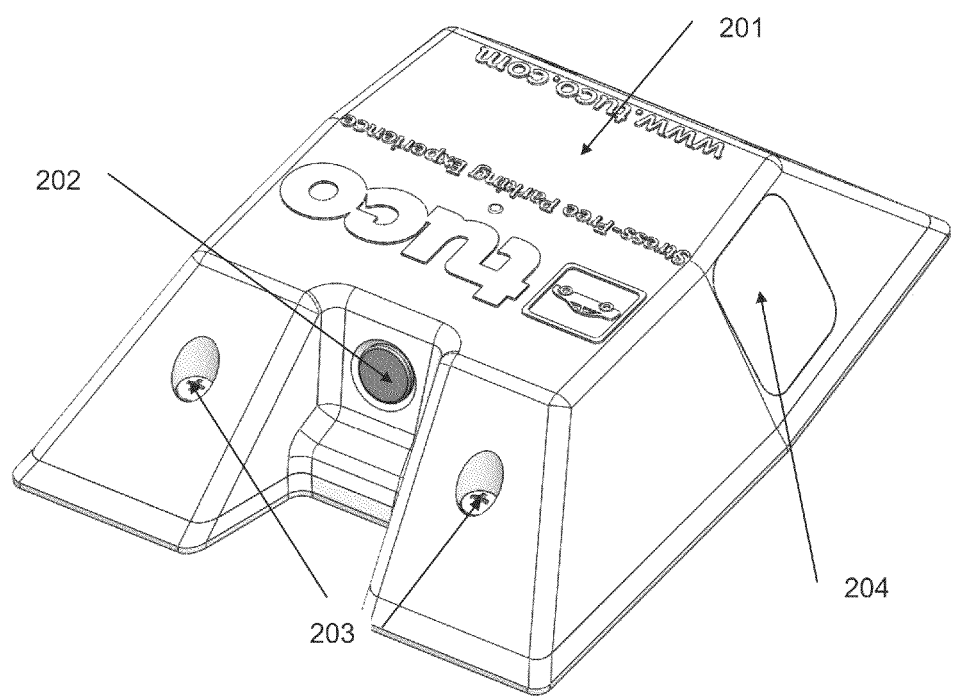
FIG. 2 is an illustration of the exterior of some embodiments of a device that monitors a parking space and notifies drivers of the parking space status.

Reference is now made to FIG. 2, which is one illustrative example of the exterior of a device in some embodiments of the invention. The exterior aspect of the device consists of a housing as at 201 that may offer protection from the environment to Ingress Protection Rating IP67 through use of an o-ring seal between the two halves of the housing. Housing is designed to withstand pressures of up to 6,000 kPa, to avoid damage of device from trucks with 151 kN axle load through the use of integrated structural elements surrounding the internal electronics that transfer forces from the top side of the housing to the pavement. The device has an UST directed at the parking space as at 202 located within a recess in the device housing to protect the UST, and is attached to the parking lot or roadway with four concrete anchor bolts and/or pavement anchor bolts and/or glue as at 203. Once the device has determined the status of the parking space the LED array as at 204 will visually notify drivers within line of sight of the device of the status of this parking space.

Figure 18:
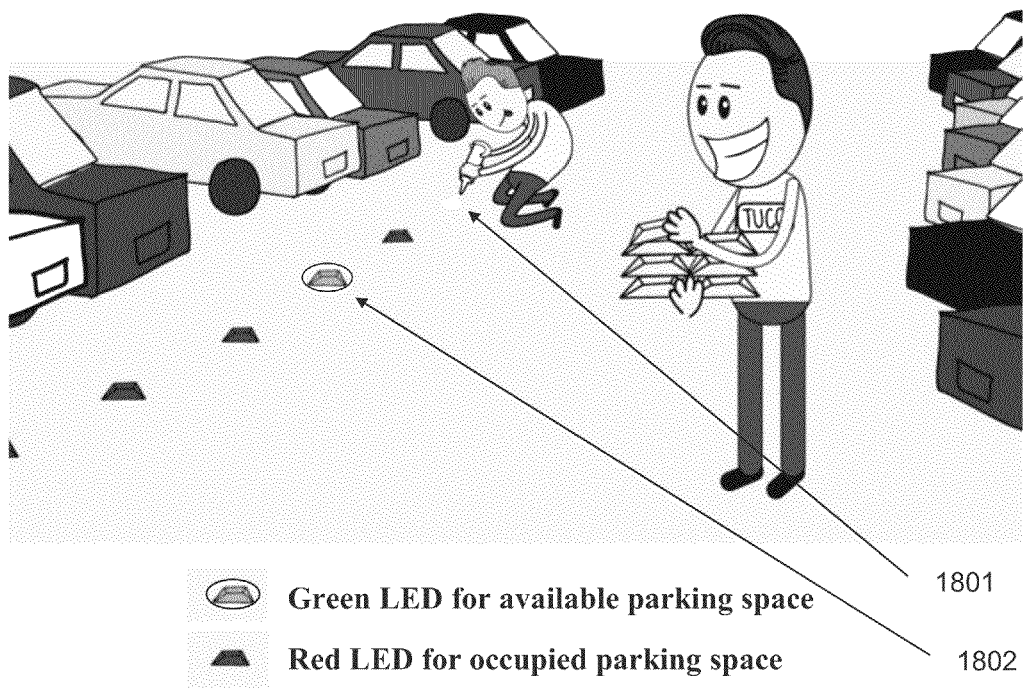
FIG. 18 is an illustration of some embodiments of installation of the devices next to parking spaces using glue.

Reference is now made to FIG. 18, which is an illustrative example installation of the devices in a parking lot and/or parking structure in some embodiments of the invention. The devices are glued to the ground near each parking space as at 1801, and after configuration of the device and/or calibration of the echo time and/or distance of the UST component to the parking space the LED array will indicate if the associated parking space is available as at 1802.

Figure 3:
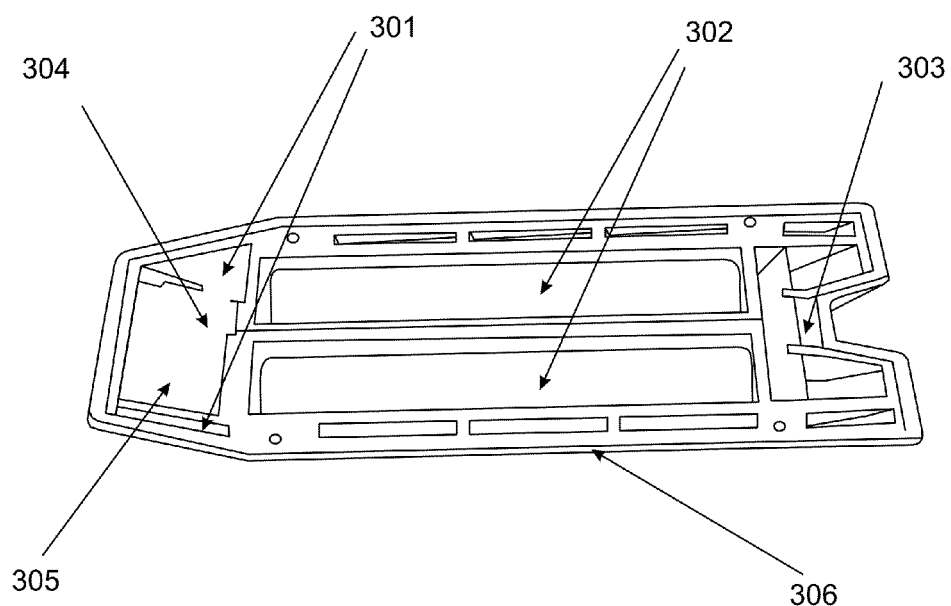
FIG. 3 is an illustration of the interior of some embodiments of a device powered by 6 D-size alkaline batteries that monitors a parking space and notifies drivers of the parking space status.

Reference is now made to FIG. 3, which is one illustrative example of the interior of a device in some embodiments of the invention. The housing of this device as at 306 contains and protects the main board with the processing unit as at 305, and an optional RF electronics broadcasting card as at 304 to transfer the parking space status to an internet server. Also within the housing are the LED arrays as at 301 for notifying the parking space status to users, and six D-size batteries to power the device as at 302. At the rear of the device in the direction of the parking space is the UST 303 which is pointed in a trajectory so as to detect the occupancy of the parking space and located within a recess in the device housing to protect the UST.

Figure 4:
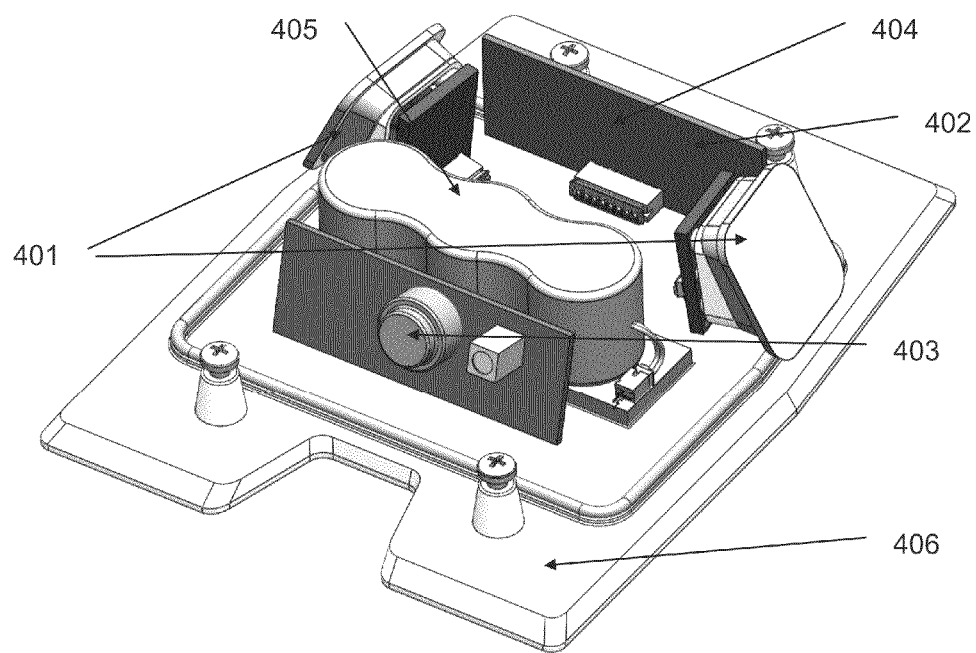
FIG. 4 is an illustration of the interior some embodiments of a device powered by a CR2477-size coin battery pack that monitors a parking space and notifies drivers of the parking space status.

Reference is now made to FIG. 4, which is an illustrative example of the interior of a device in some embodiments of the invention. The housing of this device as at 406 contains and protects the main board with the processing unit as at 404, and an optional RF electronics broadcasting card as at 402 to transfer the parking space status to an internet server and/or receive commands from the internet server, for example to set the device to power save mode and/or request a status report. Also within the housing are the LED arrays as at 401 for notifying the parking space status to users, and 15 CR2477 size batteries combined in a battery pack to power the device as at 405. At the rear of the device in the direction of the parking space is the UST 403 which is pointed in a trajectory so as to detect the occupancy of the parking space and located within a recess in the device housing to protect the UST.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or actions, but only if the additional ingredients and/or actions do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for notifying at least one user of the status of a plurality of parking spaces, comprising:
   transmitting at least one pulse from each of a plurality of transceivers, wherein each of said plurality of transceivers is located on an opposing side of a device housing and angled at a trajectory towards one of a plurality of parking spaces, and for each pulse:
      receiving by respective transceiver a corresponding echo created by said pulse being reflecting back from at least one object occupying respective said parking space;
      measuring corresponding echo time by at least one processing unit;

comparing said corresponding echo time to a predefined range of echo times by at least one processing unit to determine occupancy of respective said parking space;

using said occupancy of respective said parking space to determine the status of respective said parking space by at least one processing unit, together with information on time of day and parking space permission; and notifying at least one user of respective said parking space status by visual indication from a plurality of respective light emitting diode arrays.

2. The method of claim 1, wherein said user is a driver of a motor vehicle and looking for a vacant parking space, and said driver uses said visual notification to find said vacant parking space for said motor vehicle.

3. The method of claim 1, wherein said notification of parking space status is further transferred to at least one internet server together with information on geographic location of said plurality of parking spaces.

4. The method of claim 3, wherein said user is a driver of a motor vehicle looking for a vacant parking space, said driver parks their motor vehicle in said vacant parking space, and said internet server notifies said driver when said vehicle has been moved.

5. The method of claim 3, wherein said user is a parking space manager and said internet server transfers to said parking manager a plurality of parking space status notifications, both current and historical, which are used to plan future parking resources.

6. The method of claim 3, wherein said user is parking enforcement officer, and said internet server transfers said parking space notification which is of a status that corresponds to a parking violation.

7. The method of claim 1, wherein said plurality of transceivers are each an ultrasound transceiver and said at least one pulse is an ultrasound pulse.

8. The method of claim 1, wherein said plurality of transceivers are each a multiple sensor transceiver each angled at a trajectory to monitor a plurality of adjacent parking spaces on the same side of said roadway and said processing unit produces a plurality of associated parking space statuses.

9. The method of claim 1, wherein said echo time is further processed by said at least one processing unit to convert echo time to distance to a parked vehicle and said predefined range is measured by distance units allowing more convenient installation.

10. The method of claim 1, wherein determining said occupancy and said notifying are performed concurrently for said plurality of parking spaces.

11. A device for monitoring and notifying at least one user of the status of a plurality of parking spaces, comprising:

a plurality of transceivers each transmitting at least one pulse and receiving at least one echo from respective said pulse that has reflected off an object occupying one of said plurality of parking spaces;

at least one processing unit configured for measuring time between each said pulse and each said corresponding echo for determining statuses of said associated plurality of parking spaces;

at least one light emitting diode array capable of at least one visual notification through the use of emitted light colors, light flashing rates, and light flashing patterns for notifying said at least one user of statuses of said plurality of parking spaces;

at least one power source for supplying power to said plurality of transceivers, said at least one processing unit, and said at least one light emitting diode array; and a housing for containing said plurality of transceivers, said at least one processing unit, said at least one power source and said at least one light emitting diode array wherein said housing is specifically designed to provide protection of internal components against adverse effects of the environment and against adverse effects of vertical and sheer stresses from motor vehicles rolling over housing, wherein each of said plurality of transceivers is located on opposing sides of said housing and angled at a trajectory towards one of said associated plurality of parking spaces.

12. The device of claim 11, wherein said device further comprises an RF electronics transceiver to send said plurality of parking space statuses to and receive instructions from at least one internet server, relayed through at least one routing controller.

13. The device of claim 12, wherein said at least one power source is at least one rechargeable battery contained within said housing to provide power to said plurality of transceivers, said at least one processing unit, and said at least one notification unit.

14. The device of claim 11, wherein said at least one power source is at least one battery contained within said housing to provide power to said plurality of transceivers, said at least one processing unit, and said at least one notification unit.

15. The device of claim 11, further comprising at least one photovoltaic cell for recharging said at least rechargeable battery contained within said housing to provide power to said plurality of transceivers, said at least one processing unit, and said at least one notification unit.

16. The device of claim 11, wherein said at least one power source is at least one alternating current power supply external to said housing to provide power to said plurality of transceivers, said at least one processing unit, and said at least one notification unit.

17. The device of claim 11, wherein said plurality of transceivers are each at least one ultrasound transceiver.

18. The device of claim 11, wherein said plurality of transceivers each comprises a separate at least one emitter and separate at least one receiver.

19. The device of claim 11, wherein said plurality of transceivers are each a multiple sensor transceiver for monitoring a plurality of corresponding adjacent parking spaces.

20. The device of claim 11, wherein said housing contains structural elements designed to withstand rollover pressures from vehicles.

21. The device of claim 11, wherein said housing includes an integrated o-ring seal between top and bottom halves of said housing to offer protection from adverse effects due to the environment, including dust, humidity, water and the like.

22. The device of claim 11, wherein said device is located adjacent to the parking space.

23. The device of claim 11, wherein said device is located up to 4 meters from the parking space.

24. The device of claim 11, wherein said housing contains a plurality of recesses in said housing each for protection of corresponding one of said plurality of transceivers.

* * * * *